United States Patent
Wollbrink et al.

(10) Patent No.: US 6,968,418 B2
(45) Date of Patent: Nov. 22, 2005

(54) DATA FORWARDING BY HOST/PCI-X BRIDGES WITH BUFFERED PACKET SIZE DETERMINED USING SYSTEM INFORMATION

(75) Inventors: Curtis Carl Wollbrink, Rochester, MN (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 10/122,993

(22) Filed: Apr. 15, 2002

(65) Prior Publication Data

US 2003/0196020 A1 Oct. 16, 2003

(51) Int. Cl.⁷ ............................................ G06F 13/36
(52) U.S. Cl. ................... 710/310; 710/306; 710/51; 710/10
(58) Field of Search .................... 710/305–306, 710/310–316, 8–10, 33–35, 51–56, 1, 2, 710/100; 713/1, 2, 100; 711/212–213, 170–173

(56) References Cited

U.S. PATENT DOCUMENTS

| | | | |
|---|---|---|---|
| 6,026,451 A * | 2/2000 | Sreenivas | 710/39 |
| 6,058,450 A * | 5/2000 | LaBerge | 710/107 |
| 6,418,494 B1 * | 7/2002 | Shatas et al. | 710/305 |
| 6,425,024 B1 * | 7/2002 | Kelley et al. | 710/56 |
| 6,526,495 B1 * | 2/2003 | Sevalia et al. | 711/173 |
| 6,546,447 B1 * | 4/2003 | Buckland et al. | 710/306 |
| 6,560,652 B1 * | 5/2003 | Larson et al. | 709/232 |
| 6,578,102 B1 | 6/2003 | Batchelor et al. | |
| 6,581,129 B1 | 6/2003 | Buckland et al. | |
| 6,594,722 B1 * | 7/2003 | Willke et al. | 710/313 |
| 6,615,295 B2 * | 9/2003 | Shah | 710/54 |
| 6,646,986 B1 * | 11/2003 | Beshai | 370/230.1 |
| 6,647,454 B1 * | 11/2003 | Solomon | 710/310 |
| 6,694,397 B2 | 2/2004 | Lackey, Jr. et al. | |
| 6,715,021 B1 * | 3/2004 | Paul et al. | 710/310 |
| 6,760,791 B1 * | 7/2004 | Askar | 710/52 |
| 6,760,792 B1 | 7/2004 | Askar | |
| 6,795,886 B1 * | 9/2004 | Nguyen | 710/310 |
| 6,810,098 B1 * | 10/2004 | Paul et al. | 375/372 |
| 2002/0144037 A1 * | 10/2002 | Bennett et al. | 710/105 |
| 2004/0225774 A1 * | 11/2004 | Shah et al. | 710/200 |

OTHER PUBLICATIONS

U.S. Appl. No. 10/122,989 filed Apr. 15, 2002, entitled "Improved Split Competion Performance of PCI-X Bridges".

* cited by examiner

*Primary Examiner*—Paul R. Myers
*Assistant Examiner*—Raymond N Phan
(74) *Attorney, Agent, or Firm*—Moser, Patterson & Sheridan, LLP

(57) ABSTRACT

Embodiments are provided in which a method is described for transferring data in a digital system comprising a first bus, a second bus, and a bridge coupling the first and second buses. During system initialization, an initialization program collects system information of the digital system. Then, based on the system information of the digital system, the initialization program determines a buffered packet size and configures the bridge with the buffered packet size. After system initialization, the bridge transfers data from the first bus to the second bus via the bridge according to the buffered packet size.

20 Claims, 3 Drawing Sheets

DATA FORWARDING BY HOST/PCI-X BRIDGES WITH BUFFERED PACKET SIZE DETERMINED USING SYSTEM INFORMATION

BACKGROUND OF THE INVENTION

1. Field of the Invention

The present invention generally relates to PCI-X (Peripheral Component Interconnect-X) bridges, and more particularly to Host/PCI-X bridges.

2. Description of the Related Art

In a conventional computer system, a Host/PCI-X bridge couples a Front Side Bus (FSB) and a PCI-X Bus (called PCI-X Bus 0). There may be a PCI-X device coupled to the PCI-X Bus 0. The FSB is connected to at least a processor and main memory. The processor, the main memory and the PCI-X device communicate with each other via the FSB, the Host/PCI-X bridge, and the PCI-X Bus 0.

The communication between the main memory and the PCI-X device can be a split transaction. A split transaction consists of a request by a requester followed by a completion by a completer at a later time. Assume the PCI-X device needs to read data from main memory. As a requester, the PCI-X device sends a read request to the Host/PCI-X bridge via the PCI-X bus 0. The read request is called a split read request. The Host/PCI-X bridge responds by sending back a split read response to the PCI-X device informing the PCI-X device that split completion data will be sent to it at a later time. The Host/PCI-X bridge then reinitiates the split read request to the main memory via the FSB. When the bridge has gathered all the requested data (called split completion data) from the main memory via the FSB, the bridge sends the split completion data to the PCI-X device via the PCI-X bus 0.

The mechanism used by the Host/PCI-X bridge to deliver the split completion data to the PCI-X device on the PCI-X Bus 0 has a large impact on the efficiency and latency of the computer system. Latency is defined as the time period from the time a data item is sent from a source to the time the data item is received at a destination. Efficiency of a system can be defined as how well the system's resources are used. A system operating with high efficiency means that a high percentage of the system's resources are used for the ultimate purposes of those resources, and without unnecessary overhead. For example, in the case of a bus, the system operates with high efficiency if a high percentage of the bus bandwidth is used for transferring data (which is the ultimate purpose of a bus). If a large percentage of the bus bandwidth is not used for transferring data (for instance, the bus is idle), the system operates with low efficiency. However, efficiency and latency are two competing goals in conventional computer systems.

In some PCI-X systems, low latency is the main concern. However, low latency typically causes low efficiency. In such systems, the Host/PCI-X bridge is designed to start sending split completion data to the PCI-X device as soon as it receives an entire first packet of 128 bytes (the minimum amount of data allowed transferred in a block transfer in a PCI-X system) of split completion data from the main memory. As a result, these systems operate with low latency. However, when the Host/PCI-X bridge approaches the last byte of the first packet of 128 bytes, if the Host/PCI-X bridge has not received an entire second packet of 128 bytes of split completion data from the main memory, the Host/PCI-X bridge stops after the last byte of the first packet. When the Host/PCI-X bridge has received the entire second packet of 128 bytes, the Host/PCI-X bridge sends the second packet of 128 bytes to the PCI-X device via the PCI-X bus 0, and so on. As a result, bus usage of the PCI-X bus 0 is not efficient because the PCI-X bus 0 may be idle (i.e., no device is using the bus) between the packets which the Host/PCI-X bridge forwards from the main memory to the PCI-X device.

In some other PCI-X systems, efficiency is the main concern. However, high efficiency typically causes high latency. In such systems, the Host/PCI-X bridge is designed to gather larger packets of split completion data from the main memory before sending these packets to the PCI-X device. For instance, the Host/PCI-X bridge can gather an entire first packet of 512 bytes from the main memory and send the first packet to the PCI-X device. When the Host/PCI-X bridge approaches the last byte of the first packet of 512 bytes, if Host/PCI-X bridge has not gathered an entire second packet of 512 bytes of split completion data from the main memory, the Host/PCI-X bridge stops after the last byte of the first packet. When the Host/PCI-X bridge has received the entire second packet of 512 bytes, the Host/PCI-X bridge sends the second packet of 512 bytes to the PCI-X device via the PCI-X bus 0, and so on. As a result, for the same amount of split completion data, if the packet size of 512 bytes/packet is used instead of 128 bytes/packet, the number of packets is reduced and so is the time during which the PCI-X bus 0 is idle. As a result, using a packet size of 512 bytes/packet likely reduces the time during which the PCI-X bus 0 is idle, compared with the case in which the packet size of 128 bytes/packet is used. Therefore, the systems using larger packets are more efficient. However, latency is worse because the first byte of the split completion data from the main memory is not sent to the PCI-X device by the Host/PCI-X bridge until the entire packet of 512 bytes is gathered by the Host/PCI-X bridge.

As a result, a conventional Host/PCI-X bridge that performs well in a system where efficiency is the main concern will perform poorly in another system where low latency is the main concern. Conversely, a conventional Host/PCI-X bridge that performs well in a system where low latency is the main concern will perform poorly in another system where efficiency is the main concern.

Accordingly, there is a need for an apparatus and method in which a Host/PCI-X bridge is adaptable to perform well in both a system where efficiency is the main concern and a system where low latency is the main concern.

SUMMARY OF THE INVENTION

In one embodiment, a method is described for transferring data in a digital system including a first bus, a second bus, and a bridge coupling the first and second buses. The method comprises (a) configuring the bridge with a buffered packet size, the buffered packet size being determined based on system information of the digital system, and (b) transferring data from the first bus to the second bus via the bridge according to the buffered packet size.

In another embodiment, a digital system for transferring data is described. The system comprises a first bus, a second bus, and a bridge coupling the first and second buses, wherein the bridge is configured with a buffered packet size, the buffered packet size being determined based on system information of the digital system. The bridge is further configured to transfer data from the first bus to the second bus via the bridge according to the buffered packet size.

In yet another embodiment, a method is described for transferring data in a digital system including a first bus, a second bus, and a bridge coupling the first and second buses.

The method comprises (a) executing an initialization program to collect system information of the digital system, (b) determining a buffered packet size based on the system information of the digital system, (c) configuring the bridge with the buffered packet size, and (d) transferring data from the first bus to the second bus via the bridge according to the buffered packet size.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments are provided in which a method is described for transferring data in a digital system comprising a first bus, a second bus, and a bridge coupling the first and second buses. During system initialization, an initialization program collects system information of the digital system. Then, based on the system information of the digital system, the initialization program determines a buffered packet size and configures the bridge with the buffered packet size. After system initialization, the bridge transfers data from the first bus to the second bus via the bridge according to the buffered packet size.

Figure 1:
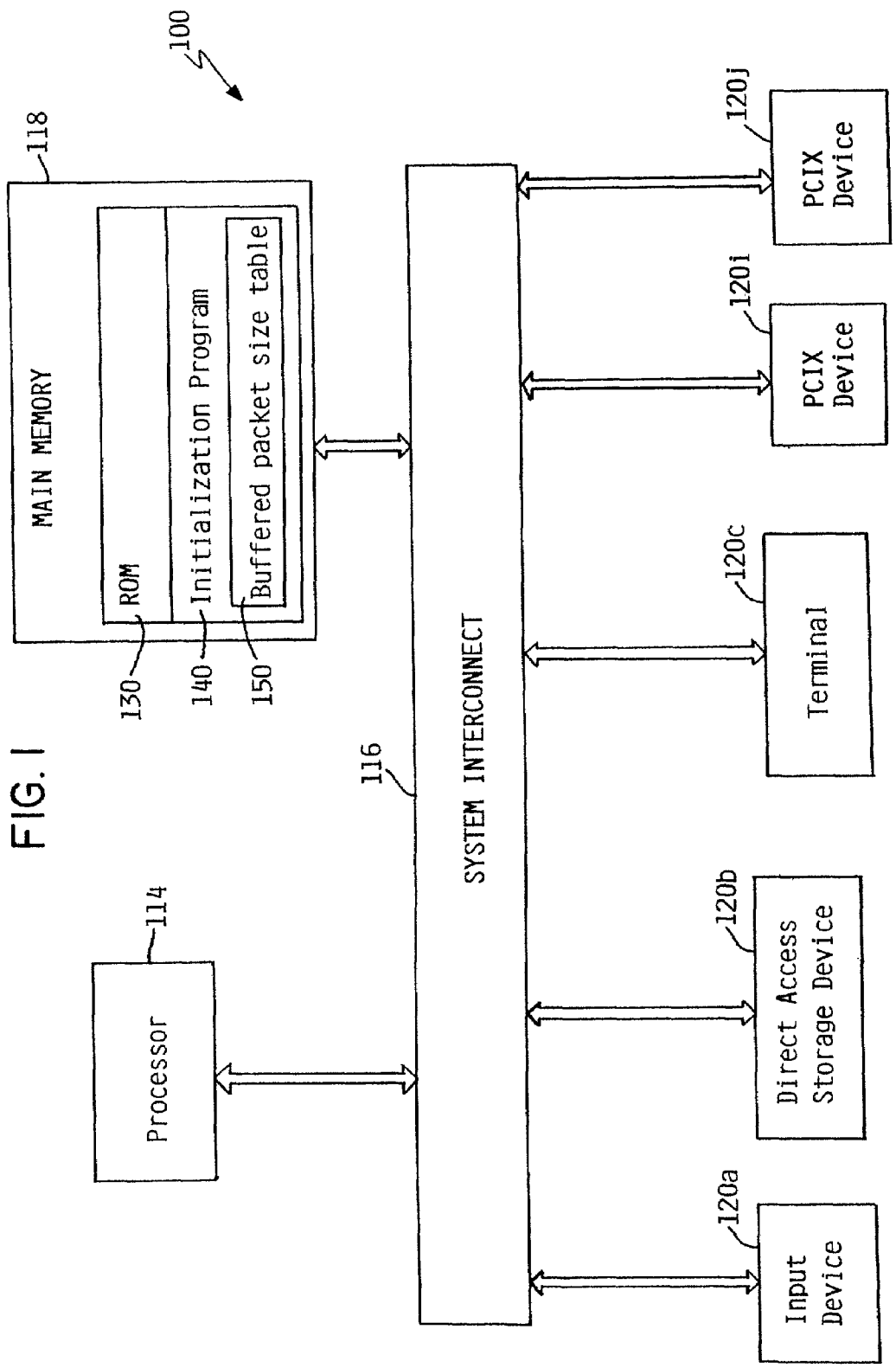
FIG. 1 is a computer system 100 according to an embodiment.

FIG. 1 is a computer system 100 according to an embodiment. In general, the computer system 100 may be a desktop or PC-based computer, a workstation, a network terminal, or other networked computer system. Illustratively, the computer system 100 includes a system interconnect 116. The computer system 100 also includes at least a processor 114, a main memory 118, an input device 120a, a storage device 120b, a terminal 120c, and PCI-X devices 120i and 120j (collectively, PCI-X devices 120); all coupled to system interconnect 116.

Terminal 120c is any display device such as a cathode ray tube (CRT) or a plasma screen. The PCI-X devices 120i and 120j may be any devices that transfer data and control signals with other devices via the system interconnect 116 according to the PCI-X specification. Input device 120a can be any device to give input to the computer system 100. For example, a keyboard, keypad, light pen, touch screen, button, mouse, track ball, or speech recognition unit could be used. Further, although shown separately from the input device, the terminal 120c and input device 120a could be combined. For example, a display screen with an integrated touch screen, a display with an integrated keyboard or a speech recognition unit combined with a text speech converter could be used.

Storage device 120b is DASD (Direct Access Storage Device), although it could be any other storage such as floppy disc drives or optical storage. Although storage 120b is shown as a single unit, it could be any combination of fixed and/or removable storage devices, such as fixed disc drives, floppy disc drives, tape drives, removable memory cards, or optical storage. Main memory 118 and storage device 120b could be part of one virtual address space spanning multiple primary and secondary storage devices.

The contents of main memory 118 can be loaded from and stored to the storage device 120b as the processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed to low speed memory devices.

In one embodiment, the main memory 118 includes a ROM 130 which stores an initialization program 140. The initialization program 140 contains a buffered packet size table 150. During initialization of the system 100, the initialization program 140 collects system information of various components of the system 100 and uses the collected system information and the buffered packet size table 150 to determine configuration data used to configure the system 100.

Figure 2:
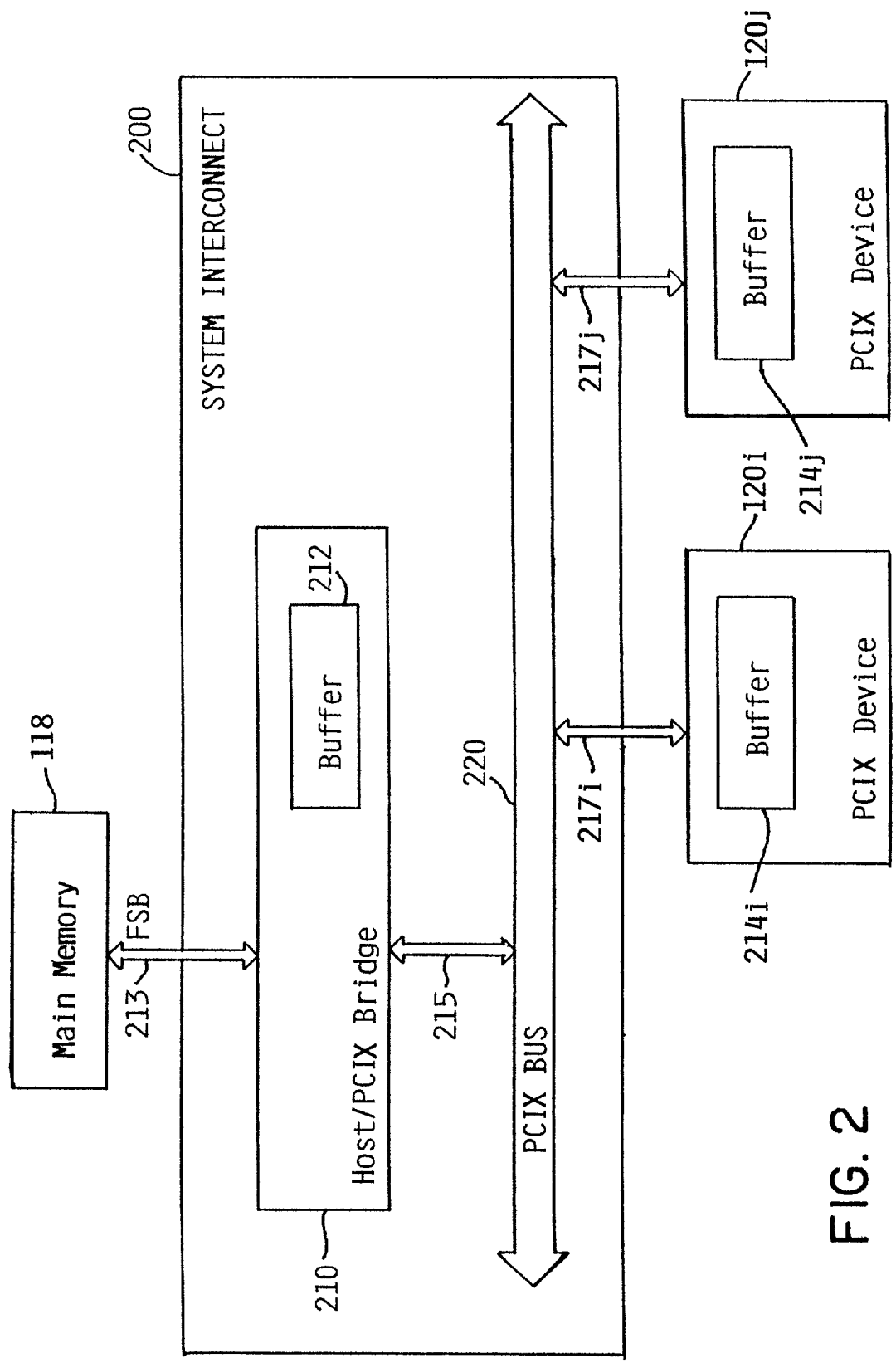
FIG. 2 shows a system interconnect 200 as an embodiment of the system interconnect 116 of FIG. 1.

FIG. 2 shows a system interconnect 200 as an embodiment of the system interconnect 116 of FIG. 1. Illustratively, the system interconnect 200 includes a Host/PCI-X bridge 210 and a PCI-X bus 220 coupled together via a connection 215. The Host/PCI-X bridge 210 is also coupled to the main memory 118 via a front side bus (FSB) 213. The Host/PCI-X bridge 210 includes, illustratively, a buffer 212. The PCI-X bus 220 is also coupled to, illustratively, the PCI-X devices 120i and 120j via connections 217i and 217j, respectively. The PCI-X devices 120i and 120j include, illustratively, buffers 214i and 214j (collectively, buffers 214), respectively.

During initialization of the system 100, the initialization program 140 collects system information of various components of the system 100. In one embodiment, the initialization program 140, during initialization, may collect such information as the operating frequency and the width of the FSB 213, the operating frequency and the width of the PCI-X bus 220, and the sizes of the buffers 212 and 214. Based on the collected information and the buffered packet size table 150, the initialization program 140 determines a buffered packet size used to configure the Host/PCI-X bridge 210 so that the Host/PCI-X bridge 210 performs data transfer between the main memory 118 and the PCI-X devices 120i and 120j with high efficiency and low latency.

Figure 3:
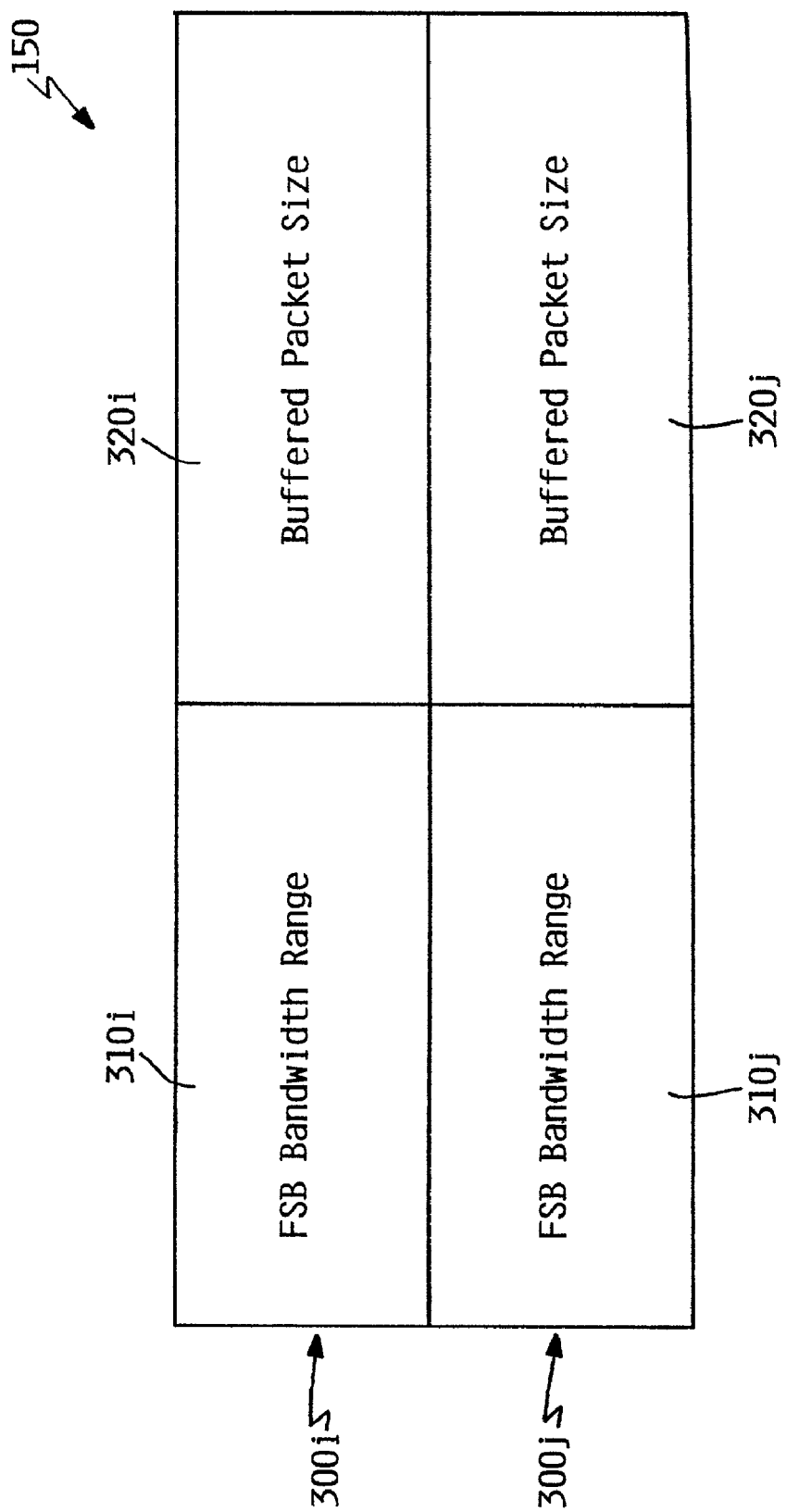
FIG. 3 shows one embodiment of the buffered packet size table 150 of FIG. 1.

FIG. 3 shows one embodiment of the buffered packet size table 150 of FIG. 1. The buffered packet size table 150 includes, illustratively, two table entries 300i and 300j (collectively, table entries 300), each of which has two fields 310 and 320. More specifically, the table entry 300i has two fields 310i and 320i. The table entry 300j has two fields 310j and 320j. The field 310i of the table entry 300i contains a first FSB bandwidth range for the FSB 213, and the field 310j of table entry 300j contains a second FSB bandwidth range for the FSB 213. The field 320*i* contains a first buffered packet size for configuring the Host/PCI-X bridge 210, and the field 320*j* contains a second buffered packet size for configuring the Host/PCI-X bridge 210. The buffered packet size table 150 may be built based on system performance analysis and simulation and stored in the initialization program 140 which itself is stored in ROM 130. For example, assume that the system 100 has only one PCI-X device 120*i* on the PCI-X bus 220, that the FSB has a bandwidth of 500 Mbytes/second, and that the PCI-X bus has a bandwidth of 1.2 GBytes/second. System performance analysis may show that the buffered packet size table 150 should yield a small buffered packet size in this case because there is only one PCI-X device 120*i* on the PCI-X bus 220. The specific preferred value for buffered packet size which the table 150 should yield in this case can be determined by sending different loads of data through the Host/PCI-X bridge 210 with the Host/PCI-X bridge 210 being configured with different values of buffered packet size. The performance of the system 100 is then measured for each value of the buffered packet size used to configure the Host/PCI-X bridge 210. Then, a preferred value of buffered packet size is chosen for an entry 300 of the table 150 corresponding to the parameters set up for the simulation (i.e., only one PCI-X device 120*i* on the PCI-X bus 220, the FSB has a bandwidth of 500 Mbytes/second, and the PCI-X bus has a bandwidth of 1.2 GBytes/second). Other entries 300 of the table 150 are built in a similar manner. Then, the table 150 is stored in the initialization program 140 which in turn is stored in ROM 130. For simplicity, the table 150 in FIG. 3 takes into consideration only the bandwidth of the FSB 213. However, it should be understood that other system parameters such as the bandwidth of the PCI-X bus 220, the number of PCI-X devices 120 on the PCI-X bus 220, and the sizes of the buffers 212 and 214 can be considered in the table 150 to determine a buffered packet size for configuring the Host/PCI-X bridge 210.

After the initialization program 140 collects the system information of the system 100, the bandwidth (frequency times bus width) of the FSB 213 is calculated and compared with the fields 310*i* and 310*j* of the entries 300 of the buffered packet size table 150. If the bandwidth of the FSB 213 falls within the range of a field 310 of an entry 300, the content of the field 320 of that entry will be used as a buffered packet size to configure the Host/PCI-X bridge 210.

As a first example illustrating the configuration and operation of the Host/PCI-X bridge 210, assume that during initialization of the system 100, the initialization program 140 collects, among other things, the operating frequency and the width of the FSB 213. Based on the collected information, the initialization program 140 determines the bandwidth (frequency times bus width) of the FSB 213 to be, illustratively, 500 Mbytes/second. Then, based on the bandwidth of the FSB 213, the initialization program 140 gets a buffered packet size from the buffered packet size table 150 for configuring the Host/PCI-X bridge 210. More specifically, assume that the FSB bandwidth of 500 Mbytes/second falls within the first FSB bandwidth range contained in the field 310*i* and that the field 320*i* of the buffered packet size table 150 contains a value 512. As a result, the initialization program 140 uses the value 512 contained in the field 320*i* as the buffered packet size for configuring the Host/PCI-X bridge 210.

Assume further that the PCI-X device 120*i* needs to read data from the main memory 118. As a requester, the PCI-X device 120*i* sends a read request to the Host/PCI-X bridge 210 via the PCI-X bus 220. The read request is called a split read request. The Host/PCI-X bridge 210 responds by sending back a split read response to the PCI-X device 120*i* informing the PCI-X device 120*i* that split completion data will be sent to it at a later time. The Host/PCI-X bridge 210 then reinitiates the split read request to the main memory 118 via the FSB 213. At a later time, the Host/PCI-X bridge 210 receives the requested data (called split completion data) from main memory 118 via the FSB 213. The Host/PCI-X bridge 210 stores the split completion data from the memory 118 in its buffer 212. When the Host/PCI-X bridge 210 has received an entire first packet of 512 Bytes of the split completion data from the memory 118, the Host/PCI-X bridge 210 arbitrates for PCI-X bus 220 and starts sending the first packet of 512 bytes to the PCI-X device 120*i* via the PCI-X bus 220.

Assume further that the Host/PCI-X bridge 210 continues receiving split completion data for a second packet of 512 Bytes while sending the first packet of 512 Bytes to the PCI-X device 120*i*. Assume further that the PCI-X bus 220 operates at 133 MHz and has a width of 8 Bytes. As a result, the bandwidth of the PCI-X bus 220 (133 MHz×8 Bytes=1.06 Gbytes/second) is larger than that of the FSB 213 (500 Mbytes/second). Consequently, when the Host/PCI-X bridge 210 finishes sending the first packet of 512 Bytes to the PCI-X device 120*i*, the Host/PCI-X bridge 210 has not received the entire second packet of 512 Bytes from the main memory 118. Therefore, the Host/PCI-X bridge 210 stops after sending the first packet of 512 Bytes to the PCI-X device 120*i* via the PCI-X bus 220. When the Host/PCI-X bridge 210 has received the entire second packet of 512 Bytes, the Host/PCI-X bridge 210 arbitrates for ownership of the PCI-X bus 220 and sends the second packet of 512 Bytes to the PCI-X device 120*i*. This sequence is repeated for each packet. In summary, for each packet of 512 Bytes of split completion data which the Host/PCI-X bridge 210 receives from the main memory 118 via the FSB 213, the Host/PCI-X bridge 210 arbitrates for the ownership of the PCI-X bus 220 and sends the packet to the PCI-X device 120*i* via the PCI-X bus 220.

As a second example illustrating the configuration and operation of the Host/PCI-X bridge 210, assume that during initialization of the system 100, the initialization program 140 collects, among other things, the operating frequency and the width of the FSB 213. Based on the collected information, the initialization program 140 determines the bandwidth (frequency times bus width) of the FSB 213 to be, illustratively, 3 Gbytes/second. Then, based on the bandwidth of the FSB 213, the initialization program 140 gets a buffered packet size from the buffered packet size table 150 for configuring the Host/PCI-X bridge 210. More specifically, assume that the FSB bandwidth of 3 Gbytes/second falls within the second FSB bandwidth range contained in the field 310*j* and that the field 320*j* of the buffered packet size table 150 contains a value 128. As a result, the initialization program 140 uses the value 128 contained in the field 310*j* as the buffered packet size for configuring the Host/PCI-X bridge 210.

Assume further that the PCI-X device 120*i* needs to read data from the main memory 118. As a requester, the PCI-X device 120*i* sends a split read request to the Host/PCI-X bridge 210 via the PCI-X bus 220. The Host/PCI-X bridge 210 responds by sending back a split read response to the PCI-X device 120*i*. The Host/PCI-X bridge 210 then reinitiates the split read request to the memory 118 via the FSB 213. At a later time, the main memory 118 sends the split completion data to the Host/PCI-X bridge 210 via the FSB 213. The Host/PCI-X bridge 210 stores the split completion data from the memory 118 in its buffer 212. When the Host/PCI-X bridge 210 has received an entire first packet of 128 Bytes of the split completion data from the memory 118, the Host/PCI-X bridge 210 arbitrates for PCI-X bus 220 and starts sending the first packet of 128 Bytes to the PCI-X device 120*i* via the PCI-X bus 220.

Assume further that the Host/PCI-X bridge 210 continues receiving split completion data for a second packet of 128 Bytes while sending the first packet of 128 Bytes to the PCI-X device 120*i*. Assume also that the PCI-X bus 220 operates at 133 MHz and has a width of 8 Bytes. As a result, the bandwidth of the PCI-X bus 220 (133 MHz×8 Bytes=1.06 Gbytes/second) is smaller than that of the FSB 213 (3 Gbytes/second). Consequently, when the Host/PCI-X bridge 210 finishes sending the first packet of 128 Bytes to the PCI-X device 120*i*, the Host/PCI-X bridge 210 has received the entire second packet of 128 Bytes from the main memory 118. Therefore, the Host/PCI-X bridge 210 continues to send the second packet of 128 Bytes to the PCI-X device 120*i* via the PCI-X bus 220, and so on until the main memory 118 stops sending split completion data to the Host/PCI-X bridge 210.

In summary, in this second example, the Host/PCI-X bridge 210 arbitrates for the ownership of the PCI-X bus 220 only once to forward the split completion data from the main memory 118 to the PCI-X device 120*i* via the PCI-X bus 220. As a result, the bandwidth of the PCI-X bus 220 is efficiently used because no bus idling occurs during the transfer of the entire split completion data. Moreover, low latency is achieved because as soon as the Host/PCI-X bridge 210 receives the entire first packet of 128 Bytes, the Host/PCI-X bridge 210 starts sending the first packet of 128 Bytes to the PCI-X device 120*i*.

In the first example above, the field 3201 contains a value 512. This buffered packet size of 512 Bytes is used to configure the Host/PCI-X bridge 210 during initialization. However, another value may be put in the field 320*i* to configure the Host/PCI-X bridge 210 during initialization. For instance, assume a value 128, instead of 512, is put in the field 3201 to configure the Host/PCI-X bridge 210 during initialization. As a result, as soon as the Host/PCI-X bridge 210 receives an entire first packet of 128 Bytes of split completion data from the main memory 118, the Host/PCI-X bridge 210 arbitrates for ownership of PCI-X bus 220 and starts sending the first packet of 128 Bytes to the PCI-X device 120*i*. However, in this first example, the bandwidth of the PCI-X bus 220 (1.06 Gbytes/second) is larger than that of the FSB 213 (500 Mbytes/second). As a result, when the Host/PCI-X bridge 210 finishes sending the first packet of 128 Bytes to the PCI-X device 120*i*, the Host/PCI-X bridge 210 has not received an entire second packet of 128 Bytes from the main memory 118. Therefore, the Host/PCI-X bridge 210 stops after sending the first packet of 128 Bytes to the PCI-X device 120*i* via the PCI-X bus 220. When the Host/PCI-X bridge 210 has received the entire second packet of 128 Bytes, the Host/PCI-X bridge 210 arbitrates for ownership of the PCI-X bus 220 and sends the second packet of 128 Bytes to the PCI-X device 120*i*, and so on. As a result, after transferring each packet of 128 Bytes of split completion data which the Host/PCI-X bridge 210 sends to the PCI-X device 120*i*, the PCI-X bus 220 may be idle. This is worse in terms of efficiency compared with the case in which the buffered packet size of 512 Bytes is used to configure the Host/PCI-X bridge 210 as initially assumed because the PCI-X bus 220 is more likely idle for the same amount of split completion data transferred. For example, for the same amount of 512 bytes of split completion data, if the buffered packet size of 512 Bytes is used, the data stream is continuous and no bus idling occurs for the PCI-X bus 220. But if the buffered packet size of 128 Bytes is used, there are four packets and after transferring each of the fourpackets, the PCI-X bus 220 may be idle. However, if the buffered packet size of 128 Bytes is used in the first example, lower latency is achieved. In short, the values contained in the table 150 are a matter of preference. If efficiency is the main concern, the buffered packet size of 512 Bytes should be stored in the field 320*i*. If low latency is the only concern, the buffered packet size of 128 Bytes should be stored in the field 320*i*. In general, any positive value not less than 128 Bytes can be stored in the field 320*i*. However, a multiple of 128 Bytes such as 256 and 384 bytes should be used in field 320*i* so as to simplify analysis and ultimately the design.

Similarly, in the second example above, the field 320*j* contains a value 128. This buffered packet size of 128 Bytes is used to configure the Host/PCI-X bridge 210 during initialization. However, another value may be put in the field 320*j* to configure the Host/PCI-X bridge 210 during initialization. For instance, assume a value 512, instead of 128, is put in the field 320*j* to configure the Host/PCI-X bridge 210 during initialization. As a result, as soon as the Host/PCI-X bridge 210 receives an entire first packet of 512 Bytes of split completion data from the main memory 118, the Host/PCI-X bridge 210 starts sending the first packet of 512 Bytes to the PCI-X device 120*i*. However, in this second example, the bandwidth of the PCI-X bus 220 (1.06 Gbytes/second) is smaller than that of the FSB 213 (3 Gbytes/second). As a result, when the Host/PCI-X bridge 210 finishes sending the first packet of 512 Bytes to the PCI-X device 120*i*, the Host/PCI-X bridge 210 has received an entire second packet of 512 Bytes from the main memory 118. Therefore, the Host/PCI-X bridge 210 continues to send the rest of the split completion data which it receives from the main memory 118 to the PCI-X device 120*i*. However, this is worse in term of latency compared with the case in which the buffered packet size of 128 Bytes is used to configure the Host/PCI-X bridge 210 as initially assumed. The reason is that the Host/PCI-X bridge 210 must unnecessarily wait until it receives the entire first packet of 512 bytes before sending the first packet to the PCI-X device 120*i*. Whereas with the buffered packet size of 128 Bytes as initially assumed, the Host/PCI-X bridge 210 must wait for the entire first packet of only 128 Bytes before sending the first packet to the PCI-X device 120*i*. As a result, in the second example, 128 rather than 512 should be put in the field 320*j* to configure the Host/PCI-X bridge 210 during initialization.

It is understood that the buffered packet size table 150 described above is merely illustrative and persons skilled in the art will recognize that the present invention admits of other embodiments. In one embodiment, the buffered packet size table 150 has more than two entries 300 to accommodate more than two FSB bandwidth ranges. In another embodiment, each entry 300 of the buffered packet size table 150 has more fields to take into account other system parameters. Illustratively, one more field can be added for the number of PCI-X devices on the PCI-X bus 220. There may be two cases: (a) one or less PCI-X device and (b) two or more PCI-X devices reside on the PCI-X bus 220. As a result, there must be four table entries 300 to accommodate four combinations of FSB bandwidth range and number of PCI-X devices on the PCI-X bus 220. If there is one or less PCI-X device on the PCI-X bus 220, after transferring each packet of split completion data from the Host/PCI-X bridge 210 to the PCI-X device 120*i*, the PCI-X bus 220 is certainly idle. If there are two or more PCI-X devices on the PCI-X bus 220, after transferring each packet of split completion data from the Host/PCI-X bridge 210 to the PCI-X device 120*i*, the PCI-X bus 220 is likely idle. As a result, the choice of the buffered packet size changes accordingly to reflect performance preference.

In one embodiment, the initialization program 140 can use a formula to determine the buffered packet size for configuring the Host/PCI-X bridge 210. Illustratively, the formula can take into account various system parameters such as the frequencies and bus widths of the FSB 213 and PCI-X bus 220, the sizes of buffers 212 and 214, and the number of the PCI-X devices on the PCI-X bus 220.

In one embodiment, all the buffered packet size values in the fields 320 of the buffered packet size table 150 are not less than 128. The reason is that the PCI-X bus specification dictates that if a transfer has to be disconnected, the transfer must be disconnected at a block boundary. According to the PCI-X bus specification, a block has 128 Bytes. As a result, if a buffered packet size value in a field 320 of the buffered packet size table 150 is less than 128 and the Host/PCI-X bridge 210 is configured with this buffered packet size value, the Host/PCI-X bridge 210 may run out of split completion data and have to stop at other than a block boundary, thereby violating the PCI-X bus specification. Of course, the invention is applicable even if the PCI-X bus specification changes. Thus, it is contemplated that in some systems the block size may be other than 128 bytes.

In yet another embodiment, all the buffered packet size values in the fields 320 of the buffered packet size table 150 are multiple of 128, such as 128, 256, 384, and 512. The sizes of the buffers 212 and 214 are also multiple of 128 Bytes. This facilitates data transfer management as described above (buffered packet size values 128 and 512 are multiple of 128).

In the first and second examples above, the buffered packet size values 512 and 128, respectively, are empirically determined and stored in the table 150. These values also reflect performance preference of the designer. If high efficiency is preferred in a particular system with particular system parameters, one buffered packet size value may be stored in the entry 300 of the table 150 that corresponds to those particular system parameters. However, if low latency is preferred in the same system, another buffered packet size value may be stored in the same entry 300.

In summary, the Host/PCI-X bridge 210 can be configured during system initialization to handle different system requirements. As a result, the system 100 achieves relatively high efficiency and low latency.

While the foregoing is directed to embodiments of the present invention, other and further embodiments of the invention may be devised without departing from the basic scope thereof, and the scope thereof is determined by the claims that follow.

What is claimed is:

1. A method for transferring data in a digital system comprising a first bus, a second bus, and a bridge coupling the first and second buses, the method comprising:
   configuring the bridge with a buffered packet size, the buffered packet size being determined based on system information of the digital system, wherein configuring the bridge with the buffered packet size comprises:
   collecting system information of the digital system; and
   determining the buffered packet size based on the system information of the digital system, wherein determining the buffered packet size based on the system information of the digital system comprises applying the system information to a buffered packet size table to determine the buffered packet size,
   wherein the buffered packet size table is built based on system performance analysis and simulation and stored in an initialization program; and
   transferring data from the first bus to the second bus via the bridge according to the buffered packet size.

2. The method of claim 1, wherein building the buffered packet size table based on the system information of the digital system comprises applying the system information to a formula to determine the buffered packet size.

3. The method of claim 1, wherein transferring data from the first bus to the second bus via the bridge according to the buffered packet size comprises:
   transferring a data packet of the buffered packet size from the first bus to the bridge; and
   transferring the data packet from the bridge to the second bus in response to the bridge receiving the entire data packet from the first bus.

4. The method of claim 3, wherein transferring data from the first bus to the second bus via the bridge according to the buffered packet size further comprises transferring additional data from the first bus to the bridge after transferring the data packet from the first bus to the bridge and while transferring the data packet from the bridge to the second bus.

5. The method of claim 1, wherein the bridge is a Host/PCI-X bridge.

6. The method of claim 5, wherein the buffered packet size is positive and a multiple of 128 bytes.

7. A digital system, comprising a first bus, a second bus, and a bridge coupling the first and second buses, wherein
   the bridge is configured with a buffered packet size, the buffered packet size being determined based on system information of the digital system;
   the bridge is further configured to transfer data from the first bus to the second bus via the bridge according to the buffered packet size;
   wherein the system is configured to collect system information of the digital system;
   the system is further configured to determine the buffered packet size based on the system information of the digital system; and
   the system is further configured to apply the system information to a buffered packet size table to determine the buffered packet size, wherein the buffered packet size table is built based on system performance analysis and simulation and stored in an initialization program.

8. The system of claim 7, wherein the system is further configured to apply the system information to a formula to build the buffered packet size table.

9. The system of claim 7, wherein the bridge is configured to
   transfer a data packet of the buffered packet size from the first bus to the bridge, and
   transfer the data packet from the bridge to the second bus in response to the bridge receiving the entire data packet from the first bus.

10. The system of claim 9, wherein the bridge is further configured to transfer additional data from the first bus to the bridge after transferring the data packet from the first bus to the bridge and while transferring the data packet from the bridge to the second bus.

11. The system of claim 7, wherein the bridge is a Host/PCI-X bridge.

12. The system of claim 11, wherein the buffered packet size is positive and a multiple of 128 bytes.

13. A method for configuring a bridge coupling a first bus and second bus in a digital system, the method comprising:
executing an initialization program to collect system information of the digital system, wherein the initialization program performs a simulation and an analysis of system performance and builds a buffered packet size table based on the system performance simulation and analysis;
determining a buffered packet size for transferring data from the first bus to the second bus via the bridge, the buffered packet size determined by applying the collected system information against the buffered packet size table; and configuring the bridge with the buffered packet size, wherein the bridge is configured to buffer a data packet of the buffered packet size from the first bus and to transfer the data packet from the bridge to the second bus in response to the bridge receiving the entire data packet from the first bus.

14. The method of claim 13, wherein the system information includes the following parameters:
a first bus bandwidth;
a second bus bandwidth;
a number of devices connected to the second bus; and
respective buffer sizes for the devices connected to the second bus.

15. The method of claim 14, wherein the bridge is a Host/PCI-X bridge, the first bus is a Front Side Bus (FSB) and the second bus is a PCI-X bus and wherein the bridge is selectively configured to reduce latency of data packets becoming available for transfer to the second bus or increase efficiency of data packets transferred through the second bus.

16. The method of claim 15, wherein
when the first bus bandwidth is less than the second bus bandwidth allocated to each device connected to the second bus, the buffered packet size is set to increase efficiency of data packets transferred through the second bus; and
when the first bus bandwidth is more than the second bus bandwidth allocated to each device connected to the second bus, the buffered packet size is set to reduce latency of data packets becoming available for transfer to the second bus.

17. The method of claim 1, wherein the system information includes the following parameters:
a first bus bandwidth;
a second bus bandwidth;
a number of devices connected to the second bus; and
respective buffer sizes for the devices connected to the second bus.

18. The method of claim 17, wherein the buffered packet size is selectively set to increase efficiency of data packets transferred through the second bus or to reduce latency of data packets becoming available for transfer to the second bus.

19. The system of claim 7, wherein the system information includes the following parameters:
a first bus bandwidth;
a second bus bandwidth;
a number of devices connected to the second bus; and
respective buffer sizes for the devices connected to the second bus.

20. The system of claim 19, wherein the buffered packet size is selectively set to increase efficiency of data packets transferred though the second bus or to reduce latency of data packets becoming available for transfer to the second bus.

* * * * *